(12) United States Patent
Kim et al.

(10) Patent No.: US 10,894,528 B2
(45) Date of Patent: Jan. 19, 2021

(54) VEHICLE SMART KEY SYSTEM AND CONTROL METHOD THEREOF

(71) Applicants: Hyundai Motor Company, Seoul (KR); Kia Motors Corporation, Seoul (KR)

(72) Inventors: Chang Sub Kim, Seongnam-Si (KR); Keun Ryang Park, Anyang-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/509,351

(22) Filed: Jul. 11, 2019

(65) Prior Publication Data

US 2020/0269811 A1   Aug. 27, 2020

(30) Foreign Application Priority Data

Feb. 25, 2019   (KR) .................. 10-2019-0022004

(51) Int. Cl.
*B60R 25/24* (2013.01)
*G07C 9/00* (2020.01)

(52) U.S. Cl.
CPC ........ *B60R 25/245* (2013.01); *G07C 9/00309* (2013.01); *G07C 2009/00333* (2013.01); *G07C 2009/00507* (2013.01)

(58) Field of Classification Search
CPC ............................ B60R 25/24; G07C 2209/63
USPC ............................................................ 340/5.72
See application file for complete search history.

(56) References Cited

U.S. PATENT DOCUMENTS

| | | | |
|---|---|---|---|
| 9,499,125 B2 | 11/2016 | Akay et al. | |
| 2008/0101610 A1* | 5/2008 | Birk | H04L 9/0891 380/277 |
| 2008/0117079 A1* | 5/2008 | Hassan | B60R 25/045 340/901 |
| 2017/0129537 A1 | 5/2017 | Kim | |
| 2017/0249791 A1* | 8/2017 | Woo | G07C 9/00309 |
| 2018/0218470 A1* | 8/2018 | Belwafa | G06Q 50/30 |
| 2019/0164367 A1* | 5/2019 | Vincenti | H04W 12/08 |

FOREIGN PATENT DOCUMENTS

| | | |
|---|---|---|
| KR | 10-2013-0033731 A | 4/2013 |
| KR | 10-1700765 B1 | 1/2017 |
| KR | 10-1892026 B1 | 8/2018 |

* cited by examiner

*Primary Examiner* — Frabricio R Murillo Garcia
(74) *Attorney, Agent, or Firm* — Morgan, Lewis & Bockius LLP

(57) ABSTRACT

A vehicle smart key system may include a smart key, and a smart key control device mounted on a vehicle that recognizes a position of the smart key through wireless communication with the smart key, activates vehicle functions in a stepwise manner based on the position of the smart key, and determines whether to assign a vehicle access right to the smart key.

15 Claims, 4 Drawing Sheets

VEHICLE SMART KEY SYSTEM AND CONTROL METHOD THEREOF

CROSS-REFERENCE TO RELATED APPLICATION

The present application claims priority to Korean Patent Application No. 10-2019-0022004, filed on Feb. 25, 2019, the entire contents of which is incorporated herein for all purposes by this reference.

BACKGROUND OF THE INVENTION

Field of the Invention

The present invention relates to a vehicle smart key system and a control method thereof.

Description of Related Art

A vehicle smart key system refers to a system configured for identifying a user using a wireless communication technology without a mechanical key, opening or closing a vehicle door, and starting an engine. A smart key in which unique identification information is embedded transmits the unique identification information to an electronic control device disposed in a vehicle. The electronic control device configured for the smart key reads out the received unique identification information and, when user authentication is successful, generates a command for opens/closing a vehicle door or an engine control command.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle smart key system and a control method thereof which activate functions of a vehicle and a smart key in a stepwise manner according to a distance between the vehicle and the smart key.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a vehicle smart key system may include a smart key and a smart key control device mounted on a vehicle to recognize a position of the smart key through wireless communication with the smart key, to activate vehicle functions in a stepwise manner based on the position of the smart key, and to determine whether to assign a vehicle access right to the smart key.

The smart key control device may activate a first vehicle function and provides vehicle state information to the smart key when the smart key is positioned in a first zone.

The first vehicle function may be defined as a multimedia-system function.

The smart key may display the vehicle state information provided from the smart key control device on a display.

The smart key control device may activate a second vehicle function and assigns the vehicle access right to the smart key when the smart key is positioned in a second zone.

The second vehicle function may be defined as a driving-system function.

The smart key may display a user interface for vehicle control on a display when the vehicle access right is assigned.

The smart key control device may switch a vehicle door to a locked state when the smart key is out of the first zone.

According to various aspects of the present invention, a smart key control device may include a wireless communicator that performs wireless communication with a smart key, and a processor that recognizes a position of the smart key through the wireless communication with the smart key, activates vehicle functions in a stepwise manner based on the position of the smart key, and determines whether to assign a vehicle access right to the smart key.

According to various aspects of the present invention, a smart key may include a wireless communicator that performs wireless communication with a vehicle, a display that displays visual information, and a processor that controls information display of the display depending on whether a vehicle access right is assigned by the vehicle.

The processor may output vehicle state information provided from the vehicle to the display when the vehicle access right does not exist.

The processor may output a user interface for vehicle control to the display when the vehicle access right is assigned.

The processor may adjust a warning intensity for abnormality in a vehicle state depending on the position of the smart key.

According to various aspects of the present invention, a control method of a vehicle smart key system may include a first step of recognizing a position of a smart key, and a second step of activating vehicle functions in a stepwise manner based on the position of the smart key, and determining whether to assign a vehicle access right to the smart key.

The first step may include detecting the smart key and determining whether authentication for the smart key is successful.

The second step may include determining whether the smart key is positioned in a first zone, and activating a first vehicle function and providing vehicle state information to the smart key when the smart key is positioned in the first zone.

The second step may include determining whether the smart key is positioned in a second zone when the smart key is not positioned in the first zone, and activating a second vehicle function and assigning the vehicle access right to the smart key when the smart key is positioned in the second zone.

The first vehicle function may be defined as a multimedia-system function.

The second vehicle function may be defined as a driving-system function.

The first zone and the second zone may be defined as a region within a predetermined range from the vehicle.

The methods and apparatuses of the present invention have other features and advantages which will be apparent from or are set forth in more detail in the accompanying drawings, which are incorporated herein, and the following

Figure 1:
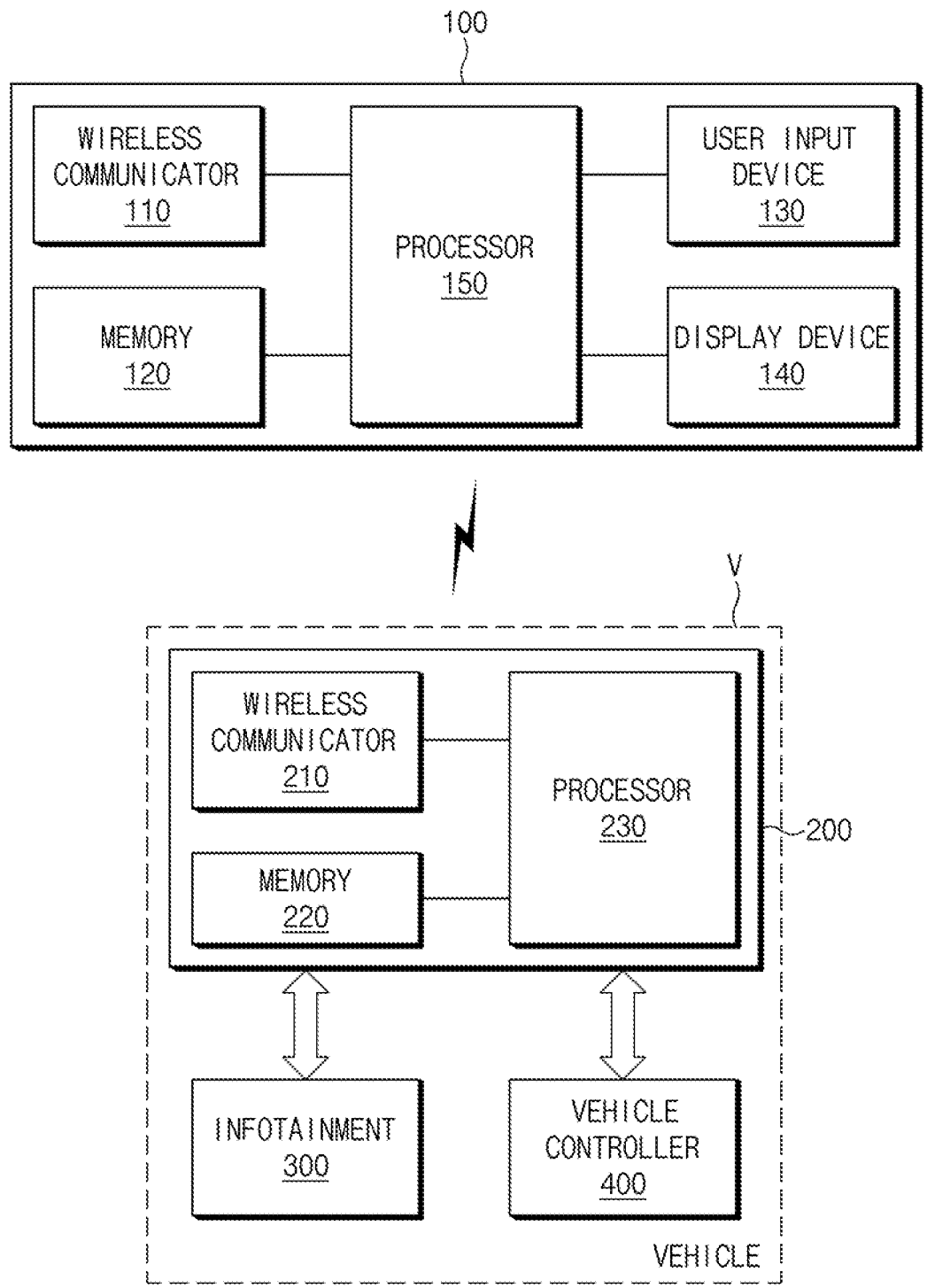
FIG. 1 is a block schematic diagram of a vehicle smart key system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
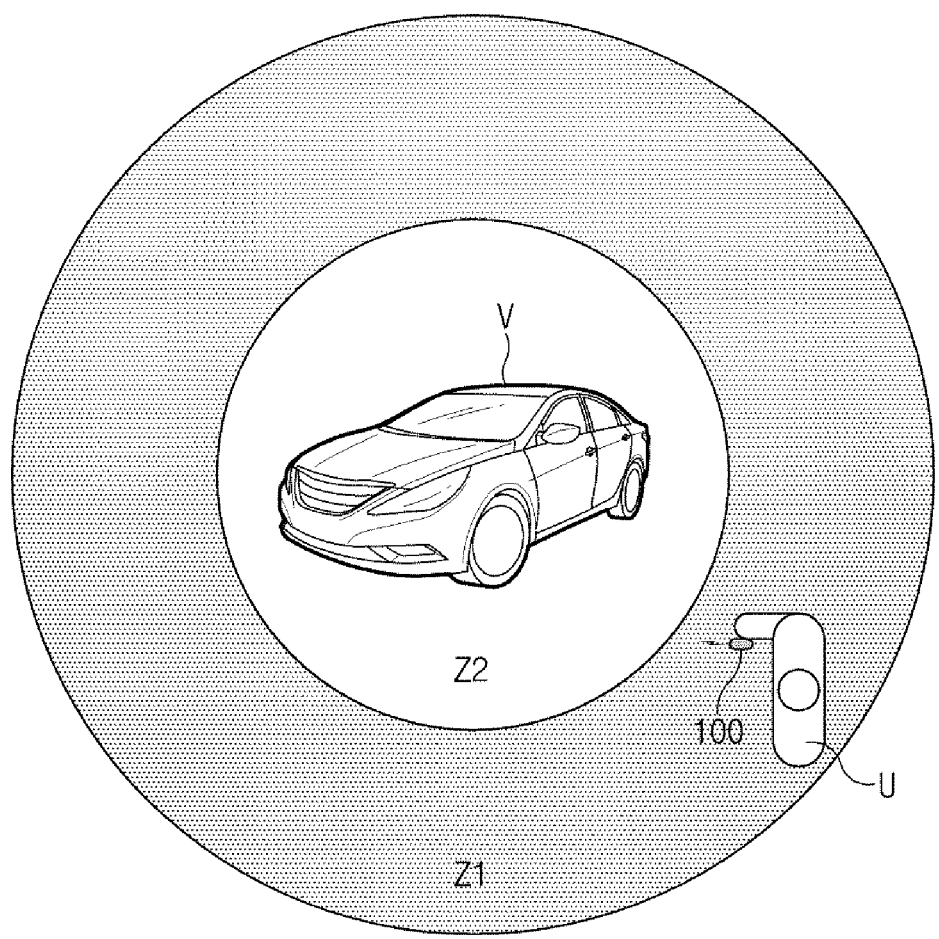
FIG. 2 is a diagram for describing recognition of a user position according to an exemplary embodiment of the present invention.

FIG. 1 is a block schematic diagram of a vehicle smart key system according to an exemplary embodiment of the present invention, and FIG. 2 is a diagram for describing recognition of a user position according to an exemplary embodiment of the present invention.

Referring to FIG. 1, a vehicle smart key system may include a smart key 100 and a smart key control device 200 mounted on a vehicle "V".

The smart key 100 may be a remote controller configured for controlling the vehicle "V" remotely. The smart key 100 may be implemented with an electronic key (key fob), a keyless go card, a smartphone, or the like.

The smart key 100 may include a wireless communicator 110, a memory 120, a user input device 130, a display device 140 and a processor 150.

The wireless communicator 110 may perform wireless communication with the vehicle "V". As the wireless Internet technology, LF (Low Frequency) communication, Radio Frequency (RF) communication, Bluetooth, Near Field Communication (NFC), RFID (Radio Frequency Identification), ZigBee, and the like may be used.

The memory 120 may store identification information, such as a personal identification number (PIN). In the disclosure, the identification information may not be arbitrarily modified and deleted by the user. The memory 120 may store software programmed to cause the processor 150 to execute predetermined operation. Also, the memory 120 may store information (data) transmitted from the vehicle "V" through the wireless communicator 110.

The memory 120 may include at least one of storage media (recording media), such as a flash memory, a hard disk, an SD card (Secure Digital Card), a random access memory (RAM), a static random access memory (SRAM), a read only memory ROM), a Programmable Read Only Memory (PROM), an Electrically Erasable and Programmable ROM (EEPROM), an Erasable and Programmable ROM (EPROM), a register, and a removable disk.

The user input device 130 may generate data according to a user's operation. For example, the user input device 130 may generate a control command, such as vehicle door unlock or engine starting according to a user input. The user input device 130 may be implemented with, for example, a keyboard, a keypad, a button, a switch, a touch pad, and/or a touch screen.

The display device 140 may output a progress status and result of operation of the processor 150. The display device 140 may display information received through the wireless communicator 110. Also, the display device 140 may display a user interface (UI).

The display device 140 may be implemented with at least one of display devices, such as a liquid crystal display (LCD), a thin film transistor liquid crystal display (TFT LCD), an organic light-emitting diode (OLED) display, a flexible display, a 3D display, a transparent display, a head-up display (HUD), and a touch screen.

The display device 140 may include an audio device such as a speaker configured for outputting audio data. Furthermore, the display device 140 may be implemented with a touch screen coupled with a touch sensor, and may be used as an input device as well as an output device.

The processor 150 may control overall operation of the smart key 100. The processor 150 may be implemented with at least one of an application specific integrated circuit (ASIC), a digital signal processor (DSP), a programmable logic device (PLD), field programmable gate array (FPGAs), a central processing unit (CPU), microcontrollers, and microprocessors.

The processor 150 may receive an authentication request signal transmitted from the vehicle "V" through the wireless communicator 110. The processor 150 may instruct the wireless communicator 110 to transmit an authentication response signal using identification information stored in the memory 120 when the authentication request signal is received.

The processor 150 may control display information related to the display device 140 according to whether a vehicle access right is assigned by the vehicle "V" is authorized to access the vehicle when authentication is successful (identification is successful). The processor 150 may output the vehicle state information (e.g., a remaining battery capacity, a remaining fuel amount, a door lock state, and a drivable distance) received through the wireless communicator 110 when the vehicle access right (vehicle control right) is not assigned. On the other hand, when the vehicle access right is assigned, the processor 150 may output, to the display device 140, a UI (e.g., an icon and/or a soft key, etc.) configured for allowing control of vehicle functions (e.g., vehicle door lock/unlock, trunk opening and closing, emergency light control, and starting).

The smart key control device 200 may be an electronic control unit (ECU) mounted on the vehicle "V" to control a ready state of the vehicle "V" and a vehicle access right (vehicle control right) of a user carrying the smart key 100.

The smart key control device 200 may be connected to an infotainment 300 and a vehicle controller 400 through an in-vehicle network (IVN). As the in-vehicle network, for example, a Controller Area Network (CAN), a Media Oriented Systems Transport (MOST) network, a Local Interconnect Network (LIN), and/or an X-by-Wire (Flexray) may be used. The infotainment 300 may be implemented with, for example, a navigation terminal, a video recording system (black box), and/or a multimedia player. The vehicle controller 400 may be implemented with, for example, an airbag system, an electronic stability control (ESC), a traction control system (TCS), an antilock brake system (ABS), an Engine Management System (EMS), a motor drive power steering (MDPS), a body control unit (BCU), and/or a battery management system (BMS), which are various types of electronic control units (ECUs) mounted on the vehicle "V".

The smart key control device 200 may activate (prepare for operation) the infotainment 300 and/or the vehicle controller 400 according to a distance between the vehicle "V" and the smart key 100. The smart key control device 200 may include a wireless communicator 210, a memory 220 and a processor 230.

The wireless communicator 210 may perform wireless communication with the smart key 100. As wireless Internet technology, Low Frequency (LF) communication, Radio Frequency (RF) communication, Bluetooth, Near Field communication (NFC), Radio Frequency Identification (RFID), ZigBee or the like may be used.

The memory 220 may store a program for operation of the processor 230, and temporarily store input and/or output data. The memory 220 may store identification information related to the smart key 100 for user authentication (user identification). The memory 220 may store a lookup table storing definition as to which of vehicle functions is activated, that is, which of vehicle functions is ready depending on the distance between the vehicle "V" and the smart key 100. The memory 220 may store information on ranges (sizes) of predetermined first and second zones.

The memory 220 may be implemented with at least one of storage media (recording media), such as a flash memory, a hard disk, an SD card (Secure Digital Card), a random access memory (RAM), a static random access memory (SRAM), a Read Only Memory (ROM), a Programmable Read Only Memory (PROM), an Electrically Erasable and Programmable ROM (EEPROM), an Erasable and Programmable ROM (EPROM), a register, a removable disk and a web storage.

The processor 230 may control overall operation of the smart key control device 200. The processor 230 may be implemented with at least one of an application specific integrated circuit (ASIC), a digital signal processor (DSP), a programmable logic device (PLD), field programmable gate array (FPGAs), a central processing unit (CPU), microcontrollers, and microprocessors.

The processor 230 may continuously transmit an authentication request signal through the wireless communicator 210. The processor 230 may receive an authentication response signal of the smart key 100 responding to the authentication request through the wireless communicator 210. The processor 230 may determine whether identification information included in the authentication response signal is identical to identification information stored in the memory 220. The processor 230 may determine that user authentication is successful when the two pieces of identification information are identical to each other, and to determine that user authentication fails when the two pieces of identification information are not identical to each other.

The processor 230 may recognize (detect) a position of the smart key 100, that is, a position of a user carrying the smart key 100 when the authentication is successful. The processor 230 may determine in which of the first zone and the second zone the smart key 100 is positioned based on the distance between the vehicle "V" and the smart key 100. Each of the first zone and the second zone may mean a region within a predetermined radius range from the vehicle "V".

When it is determined that the smart key 100 is positioned in the first zone, the processor 230 may activate a first vehicle function (a multimedia-system function), that is, the infotainment 300, and provide the vehicle state information to the smart key 100. In the instant case, the processor 230 may collect vehicle state information (e.g., battery information, drivable distance information, vehicle surrounding states and/or notification of an impact detection state) through the infotainment 300 and/or the vehicle controller 400. The processor 230 may apply user-customized settings to set the infotainment 300 in association with user profile information before the user rides in the vehicle.

When it is determined that the smart key 100 is positioned in the second zone, the processor 230 may activate a second function (a driving-system function), that is, the vehicle controller 400. When the smart key 100 enters the second zone, the processor 230 may assign a vehicle access right to the smart key 100, that is, a vehicle control right to a user "U" carrying the smart key 100. In the instant case, the processor 230 may provide information on vehicle functions which are able to be controlled through the smart key 100 and/or UI information.

When the smart key 100 is positioned in the second zone, the processor 230 may change a seat position and/or vehicle setting information in association with the user profile information. On the other hand, the processor 230 may lock the vehicle door when the smart key 100 is out of the first zone.

As illustrated in FIG. 2, when the user "U" carrying the smart key 100 enters the first zone Z1, the processor 230 of the smart key control device 200 may detect the smart key 100 to recognize a user position. When it is determined that the user is positioned in the first zone Z1, the processor 230 may wake up the infotainment 300 to shorten a loading time due to preparation of the infotainment 300 after the user rides in the vehicle. Also, the processor 230 may collect vehicle state information and provide the same to the smart key 100. The smart key 100 may output the vehicle state information to the display device 140.

When the user "U" moves from the first zone Z1 to the second zone Z2, the processor 230 of the smart key control device 200 may recognize the position of the smart key 100, that is, the user position as being in the second zone Z2. The processor 230 may wake up the vehicle driving-system vehicle controller 400 and assign the vehicle control right to the user "U" when the user "U" is positioned in the second zone Z2. The processor 230 may transmit a notification signal to notify assignment of the vehicle control right to the smart key 100. The processor 150 of the smart key 100 may output the UI for vehicle control to the display device 140.

Figure 3:
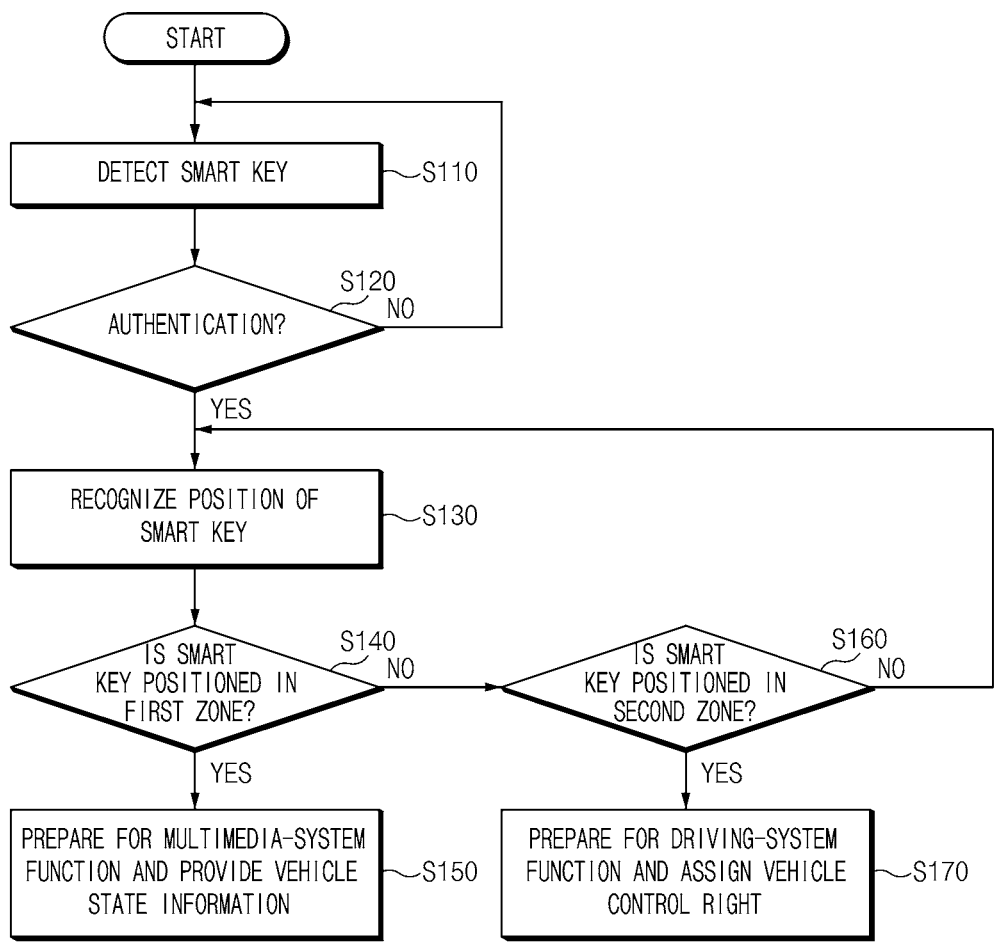
FIG. 3 is a flowchart of a control method of a vehicle smart key system according to an exemplary embodiment of the present invention.

FIG. 3 is a flowchart of a control method of a vehicle smart key system according to an exemplary embodiment of the present invention.

The smart key control device 200 may detect the smart key 100 positioned around the vehicle "V" (S110). In the instant case, the smart key control device 200 may transmit an authentication request signal to the smart key 100, and the smart key 100 may transmit an authentication response signal in a response to the received authentication request signal. The smart key control device 200 may determine whether authentication is successful or fails according to whether identification information included in the authentication response signal is identical to identification information stored in the memory 220.

The smart key control device 200 may determine whether authentication is successful when the smart key 100 is detected (S120).

The smart key control device 200 may recognize a position of the smart key 100 when the authentication is successful. The smart key control device 200 may identify which of the first zone and the second zone the user "U" carrying the smart key 100 is positioned in based on a distance between the vehicle "V" and the smart key 100.

The smart key control device 200 may determine whether the smart key 100 is positioned in the first zone based on a result of the recognition (S140).

When the smart key 100 is positioned in the first zone, the smart key control device 200 may switch a multimedia-system function (that is, a first vehicle function) to a ready state and provide vehicle state information to the smart key 100 (S150). The smart key control device 200 may switch an operation state of the infotainment 300 from a sleep state to a ready state. Also, the smart key control device 200 may transmit the vehicle state information collected through the infotainment 300 and/or the vehicle controller 400 to the smart key 100. The smart key 100 may display the vehicle state information provided from the smart key control device 200 on the display device 140.

When the smart key 100 is not positioned in the first zone in S140, the smart key control device 200 may determine whether the smart key 100 is positioned in the second zone based on a result of the recognition (S160).

When the smart key 100 is positioned in the second zone, the smart key control device 200 may switch a driving-system function (that is, a second vehicle function) to a ready state and assign a vehicle control right to the user (S170). The smart key control device 200 may wake up the driving-system vehicle controller 400 and switch the driving-system vehicle controller 400 to a ready state. Also, the smart key control device 200 may assign a vehicle access right to the smart key 100, that is, assign a vehicle control right to the user. When the vehicle access right is assigned by the smart key control device 200, the smart key 100 may display an UI for vehicle control on the display device 140.

Thereafter, when the UI is operated by the user "U", the smart key 100 may transmit a vehicle control command issued by the operation of the UI to the smart key control device 200. The smart key control device 200 may control the vehicle controller 400 according to the vehicle control command transmitted from the smart key 100 to control the vehicle "V".

For example, when the user "U" carrying the smart key 100 enters the first zone Z1 to ride in the vehicle "V", the smart key control device 200 may recognize that the user "U" is positioned in the first zone Z1 by detecting the smart key 100. The smart key control device 200 may transmit, to the smart key 100, the vehicle state information such as impact detection during parking in an image recording system (e.g., a black box), and the presence or absence of abnormality in the vehicle. The smart key 100 may output the vehicle state information provided from the smart key control device 200 to the display device 140. Therefore, the user may identify the vehicle sate, such as an external impact condition of the vehicle before the user rides the vehicle.

When the user "U" gets off the vehicle in a situation where a sunroof of the vehicle is opened and/or a smartphone is mounted on the wireless recharging pad, the smart key control device 200 may identify a position of the smart key by detecting the smart key 100 carried by the user "U". When the smart key 100 is positioned in the second zone Z2, the smart key control device 200 may transmit a warning for the user's mistake and abnormality in the vehicle state to the smart key 100. The smart key 100 may generate a warning message and/or vibration according to a position of the smart key, that is, the user position provided from the smart key control device 200. On the other hand, the smart key control device 200 may instruct the smart key 100 to output warning sound (e.g., beep) when the smart key 100 moves from the second zone Z2 to the first zone Z1. The smart key 100 may output the warning sound according to the instruction of the smart key control device 200. In the present way, the warning intensity is adjusted according to the position of the smart key 100, allowing the user to recognize abnormality in the vehicle state and the driver mistake after the user gets off the vehicle.

Figure 4:
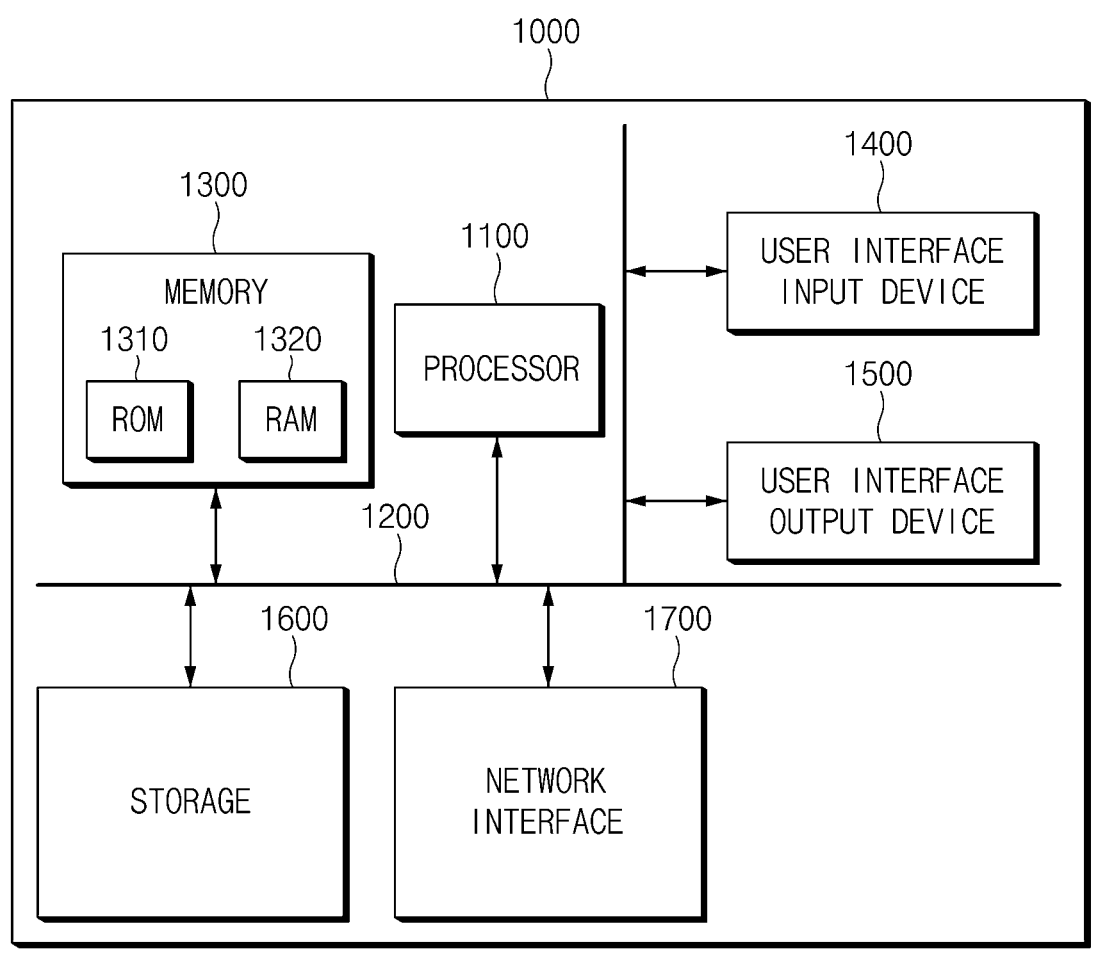
FIG. 4 is a block diagram of a computing system for executing a method of controlling a vehicle and a user right according to an exemplary embodiment of the present invention.

FIG. 4 illustrates a block diagram of a computing system for executing a method of controlling a vehicle and a user right according to an exemplary embodiment of the present invention.

Referring to FIG. 4, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present invention, it is possible to recognize a user position based on a distance between a vehicle and a smart key and set ready states for vehicle functions differently according to the recognized user position.

Furthermore, according to an exemplary embodiment of the present invention, it is possible to change a vehicle access right of the smart key depending on the user position and control information displayed on a display according to the changed vehicle access right.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle smart key system comprising:
a smart key in possession of a user of a vehicle; and
a smart key control device mounted on the vehicle to recognize a position of the smart key through wireless communication with the smart key, i) to activate, based on the position of the smart key, vehicle functions stepwisely and ii) to determine when to assign a vehicle access right to the smart key,
wherein the position of the smart key comprises a first zone and a second zone, both zones defined as distance regions within a predetermined radius range from the vehicle, such that the second zone is further from the first zone, and the first zone and the second zone are different, and
wherein the smart key control device sets the vehicle functions in association with user profile information before the user rides in the vehicle, and instructs the smart key to output a warning for abnormality in a vehicle state, upon determining that the user gets off the vehicle without recognizing the abnormality in the vehicle state and is located at the second zone; such that when the user is approaching the vehicle leaving the second zone and enters the first zone, intensity of the warning changes so that the user recognizes the abnormality in the vehicle state based on the changed intensity.

2. The vehicle smart key system of claim 1, wherein the smart key control device activates a first vehicle function among the vehicle functions and provides information of the vehicle state to the smart key in a response that the smart key is positioned in the first zone.

3. The vehicle smart key system of claim 2, wherein the first vehicle function is defined as a multimedia-system function.

4. The vehicle smart key system of claim 3, wherein the smart key displays the information of the vehicle state provided from the smart key control device on a display device.

5. The vehicle smart key system of claim 2, wherein the smart key control device activates a second vehicle function among the vehicle functions and assigns the vehicle access right to the smart key in a response that the smart key is positioned in the second zone.

6. The vehicle smart key system of claim 5, wherein the second vehicle function is defined as a driving-system function.

7. The vehicle smart key system of claim 5, wherein the smart key displays a user interface for vehicle control on a display device in a response that the vehicle access right is assigned.

8. The vehicle smart key system of claim 2, wherein the smart key control device switches a vehicle door to a locked state in a response that the smart key is out of the first zone.

9. A smart key control device mounted on a vehicle, the smart key control device comprising:
a wireless communicator configured to perform wireless communication with a smart key in possession of a user of the vehicle; and
a processor configured to recognize a position of the smart key through the wireless communication with the smart key, i) to activate, based on the position of the smart key, vehicle functions stepwisely and ii) to determine when to assign a vehicle access right to the smart key,
wherein the position of the smart key comprises a first zone and a second zone, both zones defined as distance regions within a predetermined radius range from the vehicle, such that the second zone is further from the first zone, and the first zone and the second zone are different, and
wherein the processor sets the vehicle functions in association with user profile information before the user rides in the vehicle, and instructs the smart key to output a warning for abnormality in a vehicle state, upon determining that the user gets off the vehicle without recognizing the abnormality in the vehicle state and is located at the second zone; such that when the user is approaching the vehicle leaving the second zone and enters the first zone, intensity of the warning changes so that the user recognizes the abnormality in the vehicle state based on the changed intensity.

10. A control method of a vehicle smart key system including a smart key in possession of a user of a vehicle and a smart key control device mounted on the vehicle, the control method comprising:
    a first step of recognizing, by the smart key control device, a position of the smart key; and
    a second step of i) activating, by the smart key control device, based on the position of the smart key, vehicle functions stepwisely, and ii) determining, by the smart key control device, when to assign a vehicle access right to the smart key,
    wherein the position of the smart key comprises a first zone and a second zone, both zones defined as distance regions within a predetermined radius range from the vehicle, such that the second zone is further from the first zone, and the first zone and the second zone are different, and
    wherein the smart key control device sets the vehicle functions in association with user profile information before the user rides in the vehicle, and instructs the smart key to output a warning for abnormality in a vehicle state, upon determining that the user gets off the vehicle without recognizing the abnormality in the vehicle state and is located at the second zone; such that when the user is approaching the vehicle leaving the second zone and enters the first zone, intensity of the warning changes so that the user recognizes the abnormality in the vehicle state based on the changed intensity.

11. The control method of claim 10, wherein the first step includes:
    detecting the smart key; and
    determining when authentication for the smart key is successful.

12. The control method of claim 10, wherein the second step includes:
    determining when the smart key is positioned in the first zone; and
    activating a first vehicle function among the vehicle functions and providing vehicle state information to the smart key in a response that the smart key is positioned in the first zone.

13. The control method of claim 12, wherein the second step includes:
    determining when the smart key is positioned in the second zone while the smart key is not positioned in the first zone; and
    activating a second vehicle function among the vehicle functions and assigning the vehicle access right to the smart key in a response that the smart key is positioned in the second zone.

14. The control method of claim 13, wherein the second vehicle function is defined as a driving-system function.

15. The control method of claim 12, wherein the first vehicle function is defined as a multimedia-system function.

\* \* \* \* \*